United States Patent
Kwon et al.

(10) Patent No.: US 8,917,255 B2
(45) Date of Patent: Dec. 23, 2014

(54) DEFORMABLE TOUCH SCREEN

(71) Applicant: Hyundai Motor Company, Seoul (KR)

(72) Inventors: Gideok Kwon, Seoul (KR); Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 115 days.

(21) Appl. No.: 13/709,982

(22) Filed: Dec. 10, 2012

(65) Prior Publication Data
US 2014/0055382 A1    Feb. 27, 2014

(30) Foreign Application Priority Data
Aug. 27, 2012  (KR) .................. 10-2012-0093711

(51) Int. Cl.
*G06F 3/041*  (2006.01)
*G06F 3/01*  (2006.01)
*G06F 3/044*  (2006.01)

(52) U.S. Cl.
CPC ............... *G06F 3/041* (2013.01); *G06F 3/016* (2013.01); *G06F 3/0416* (2013.01); *G06F 3/044* (2013.01); *G06F 2203/014* (2013.01); *G06F 2203/04101* (2013.01); *G06F 2203/04102* (2013.01)
USPC ........................... 345/173; 345/174; 345/175

(58) Field of Classification Search
CPC ....................................................... G06F 3/041
USPC .................................................. 345/173–175
See application file for complete search history.

(56) References Cited

U.S. PATENT DOCUMENTS

2007/0152974 A1\* 7/2007 Kim et al. ..................... 345/168
2012/0075200 A1\* 3/2012 Salo et al. ..................... 345/173

FOREIGN PATENT DOCUMENTS

KR    10-2007-0073125 A    7/2007

\* cited by examiner

*Primary Examiner* — Charles V. Hicks
*Assistant Examiner* — Sejoon Ahn
(74) *Attorney, Agent, or Firm* — Edwards Wildman Palmer LLP; Peter F. Corless

(57) ABSTRACT

The present disclosure provides a deformable touch screen including a display unit for displaying a user interface; a touch panel including a dielectric material, a first electrode coated on one end of the dielectric material, a second electrode coated on the other end of the dielectric material, a non-conductive material coated on the second electrode, and a conductive metal coated on the coated non-conductive material; a voltage controller for controlling a voltage applied between the first electrode and the second electrode; and a signal generator for applying a signal to the voltage controller, wherein the signal generator generates a signal for making a user interface button of the display unit into a 3D form according to a measured result of an increase or a decrease in mutual capacitance of a user's hand and a conductive metal.

3 Claims, 6 Drawing Sheets

DEFORMABLE TOUCH SCREEN

CROSS-REFERENCE TO RELATED APPLICATION

This application claims priority under 35 U.S.C. §119(a) to and the benefit of Korean Patent Application No. 10-2012-0093711 filed in the Korean Intellectual Property Office on Aug. 27, 2012, the entire contents of which are incorporated herein by reference.

BACKGROUND OF THE INVENTION (a) Field of the Invention

The present invention relates to a deformable touch screen, and more particularly, to a deformable touch screen that combines a touch screen with proximity sensing and tactile feedback technology to provide an improved user interface.

(b) Description of the Related Art

In general, an interface between machine and a user, that is, a human machine interface (HMI) has evolved from a conventional button type interface to a touch screen interface type. The largest reason of the change is because the button input type cannot completely satisfy the diverse needs and convenience of the user. In contrast, the touch screen input type provides a flexible esthetic appearance that has the advantage of being able to transmit a large amount of information to the user. This differs significantly from a conventional button type interface, in which the interface does not transmit a significant amount of information to the user. Accordingly, in many vehicles a touch screen is used as an HMI device for many electronic devices within the vehicle. Unfortunately, the touch screen interface is primarily visual in nature, and unlike the conventional button type input interface, conventional touch screens do not provide tactile feedback to the user. This represents a significant disadvantage because it forces the user, in this case the driver of the vehicle, to take their eyes off of the road in order to use the HMI.

The inability of conventional touch screens to provide tactile feedback to the user represents a significant problem for current vehicle designs because the modern trend is to use a "full touch screen" approach as an HMI to control most, if not all, user controllable functions within a vehicle (e.g., an air conditioner, a radio, navigation system, etc.). In this case, as described above, in order to control basic operations and functions of the vehicle, the user will be required to take their eyes off of the road at an unacceptably high frequency with an HMI that is based on a conventional touch screen. This increases the risk of an accident while driving the vehicle. Accordingly, there is an urgent need for a touch screen that provides tactile feedback to the user for use as an HMI to control vehicle functions so that the need for the driver to take their eyes off of the road will be minimized

SUMMARY OF THE INVENTION

The present invention provides a deformable touch screen that reduces the risk of car accidents by allowing the driver to keep their eyes on the road while using the touch screen as an HMI to control vehicle functions.

An exemplary embodiment of the present invention provides a deformable touch screen including: a display unit for displaying a user interface; a touch panel including a dielectric material, a first electrode coated on one end of the dielectric material, a second electrode coated on the other end of the dielectric material, a non-conductive material coated on the second electrode, and a conductive metal coated on the coated non-conductive material; a voltage controller for controlling a voltage applied between the first electrode and the second electrode; and a signal generator for providing a signal to the voltage controller, wherein the signal generator generates a signal for making a user interface button of the display unit into a 3D form according to a measured result of an increase or a decrease in mutual capacitance between a user's hand and an outer conductive metal.

Another exemplary embodiment of the present invention provides a method of deforming the touch panel, including: displaying a user interface; measuring an increase and a decrease in mutual capacitance of the user's hand and a conductive metal; generating a start signal for starting a stereogram of the touch panel in accordance with a shape of a user interface button when an increased amount of the capacitance is equal to or larger than a preset threshold; controlling a color by generating a color control signal for controlling a color on the touch panel; making the touch panel into a 3D form in accordance with the shape of the user interface button by controlling voltages applied to both ends of a dielectric material of the touch panel; controlling the touch panel made into the 3D form in accordance with the shape of the user interface button; and generating an end signal for ending the stereogram of the touch panel when the increased amount of the capacitance is smaller than the preset threshold.

According to the exemplary embodiments of the present invention, a deformable touch screen according to the present invention may reduce the risk of car accidents by increasing the ability of the driver to keep their eyes on the road and improving driver convenience by reducing the amount of time it takes the user to effect a control function in the car (e.g., adjusting the radio, programming a navigation destination, etc.) with a touch screen HMI.

DETAILED DESCRIPTION OF THE EMBODIMENTS

Figure 1:
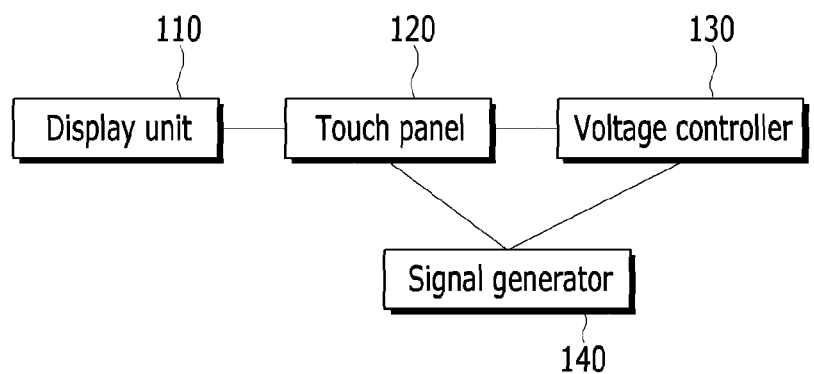
FIG. 1 illustrates a configuration of a deformable touch screen according to and exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Further, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 illustrates a configuration of an exemplary deformable touch screen according to the present invention. The deformable touch screen according to the present invention may include a display unit 110, a touch panel 120, a voltage controller 130, and a signal generator 140. The deformable touch screen according to the present invention may detect a position of a user's hand, generate a stereogram start signal of the touch panel 120 by the signal generator 140, and then transmit the stereogram start signal to the voltage controller 130. The signal generator 140 may generate the stereogram start signal by a control signal applied to the signal generator from an outside regardless of the position of the hand.

The voltage controller 130 may receive the stereogram start signal and control a voltage applied between a first electrode 121 and a second electrode 122 of the touch panel 120 to make the touch panel 120 adopt a 3D form.

The display unit 110 may display a shape of a user interface button and project the shape on the touch screen. The display unit 110 may display a single or a plurality of user interface buttons, and may display the user interface buttons interface buttons simultaneously or sequentially.

The touch panel 120 includes the first electrode 121 and the second electrode 122, and may make the shape of the button projected by the display unit 110 by a voltage difference between the first electrode 121 and the second electrode 122 applied from the voltage controller 130 into the 3D form.

The voltage controller 130 may receive a stereogram start signal generated from the signal generator 140 and may start configuring the touch panel 120 in the 3D form. The voltage controller 130 applies a voltage to the first electrode 121 and the second electrode 122 in order to make the touch panel 120 into the 3D form in accordance with the shape of the button projected by the display unit 110.

The signal generator 140 may measure an increase and/or a decrease in mutual capacitance 410 of the user's hand and a conductive metal 126, and generate a signal for configuring the touch panel 120 in the 3D form in accordance with the shape of the user interface button of the display unit 110.

The signal generator 140 may receive an external control signal (for example, a control signal applied from an external CPU), and generate a signal for configuring the touch panel 120 in the 3D form in accordance with the shape of the user interface button of the display unit 110 by the external control signal.

For example, when the user presses a button to turn on the A/C, a control signal for making the A/C related button (e.g., dual mode, temperature control and the like) into a 3D form is applied to the signal generator 140 by the CPU, and the signal generator 140 may then generate a signal for making the touch panel 120 into the 3D form in accordance with a shape of the A/C related button.

When the signal generator 140 determines that an increased amount of the capacitance is equal to or larger than a threshold, the signal generator 140 generates a color control signal for controlling a color of the touch panel 120 made into the 3D form in accordance with the shape of the user interface button. In this case, the color control signal of the signal generator may be generated together with the stereogram signal through an interworking or may be generated separately from the stereogram signal.

For example, when the signal generator 140 determines that the increased amount of the capacitance is equal to or larger than the threshold as the user's hand approaches, the signal generator 140 generates the color control signal for controlling the color of the touch panel 120 made into the 3D form together with the signal for making the touch panel into the 3D form in accordance with the shape of the user interface button.

Further, when the user presses the A/C on button, the control signal for making the A/C related button (e.g., dual mode, temperature control and the like) into a 3D form may be applied to the signal generator 140, and the signal generator 140 generates the signal for making the touch panel 120 into the 3D form in accordance with the shape of the A/C related button. In this case, when the signal generator 140 determines that the increased amount of the capacitance is equal to or larger than the threshold as the user's hand approaches in order to control the A/C related button made into the 3D form, the signal generator 140 generates the color control signal for controlling the color of the touch panel 120 made into the 3D form.

Figure 2:
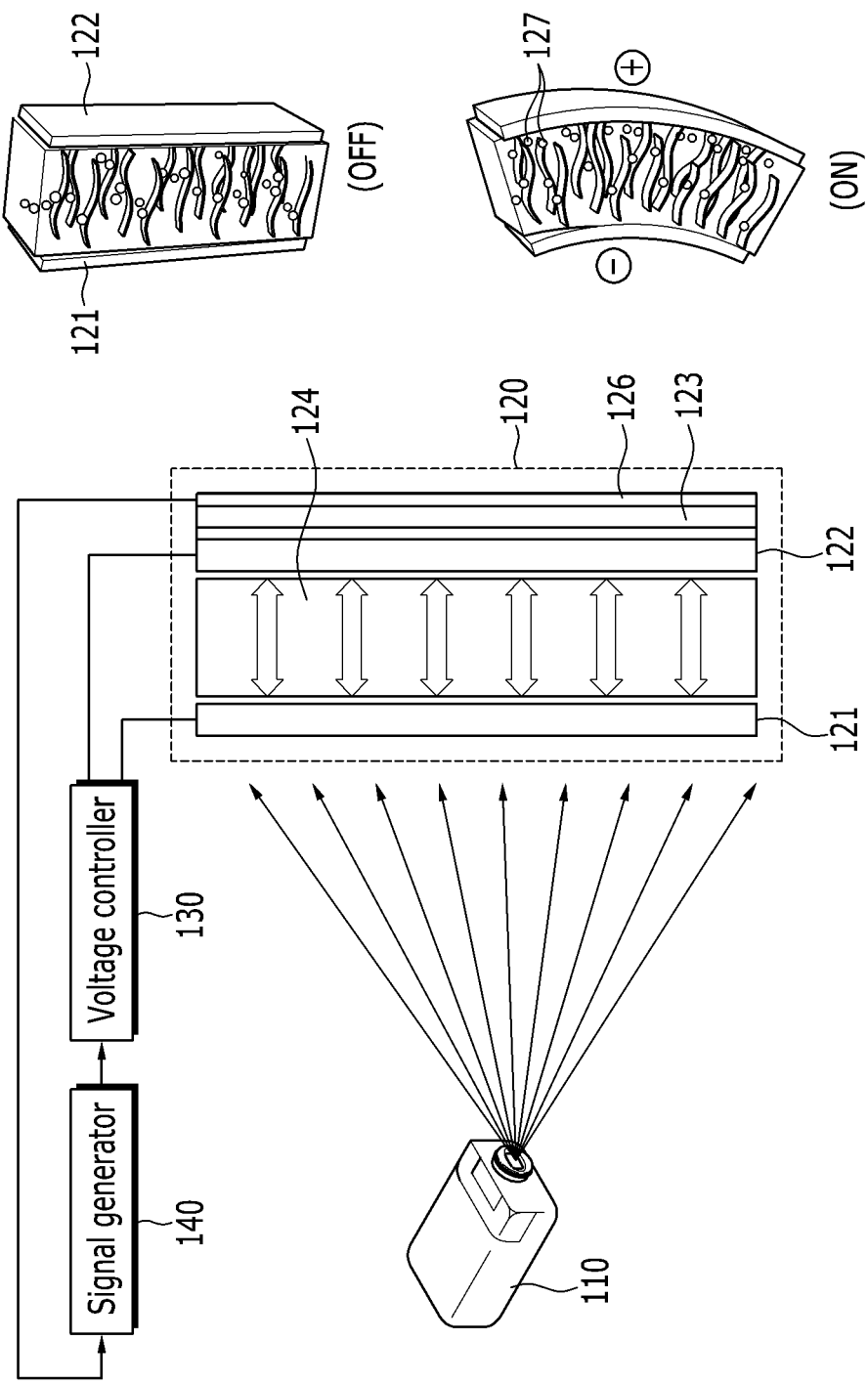
FIG. 2 illustrates a stereogram principle of a touch screen according to an exemplary embodiment of the present invention.

FIG. 2 illustrates a stereogram principle of a touch screen according to an exemplary embodiment of the present invention. A deformable touch screen according to an exemplary embodiment of the present invention includes the display panel 110, the touch panel 120, the voltage controller 130, and the signal generator 140.

The touch panel 120 includes a dielectric material 124, a first electrode 121 coated on one end of the dielectric material 124, a second electrode 122 coated on the other end of the dielectric material 124, a non-conductive material 123 coated on the second electrode 122, and a conductive metal 126 coated on the coated non-conductive material 123. The dielectric material 124 is an ionic gel 126 including a free ion 127. The first electrode 121 and the second electrode 122 are coated on both ends of the ionic gel 126. The first electrode 121 and the second electrode 122 correspond to conduction metal 126 coating (conductive plate), and are flexible and transparent materials. Each of the ends of the first electrode 121 and the second electrode 122 are connected to the voltage controller 130, and a voltage is applied through the voltage controller 130. The non-conductive material 123 (oxide layer and the like) may be coated on the second electrode 122. The transparent special conductive metal 126 (e.g., Tin Antimony Oxide: TAO) may be coated on the non-conductive material 123. The transparent special conductive metal 126 may be connected to the signal generator 140.

When the voltage controller 130 applies a negative pole to the first electrode 121 and applies a positive pole to the second electrode 122, the free ions 127 within the ionic gel 126 move to the second electrode 122. Accordingly, the second electrode 122 expands and the first electrode 121 contracts. Therefore, when a lower part of the first electrode 121 is fixed, the ionic gel 126 rises to the second electrode 122, and thus the touch panel 120 may adopt a 3D form in accordance with the shape of the user interface button.

Figure 3:
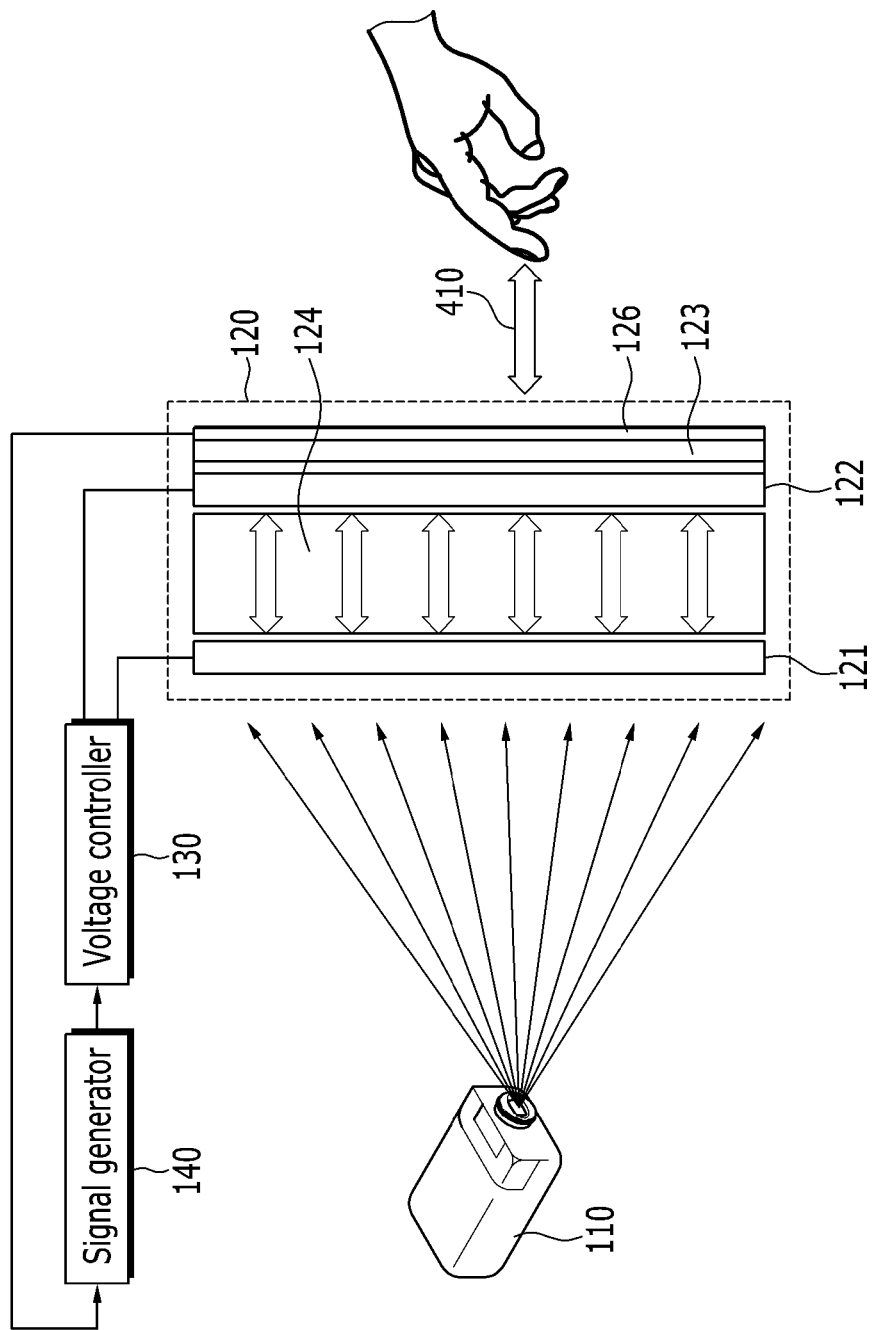
FIG. 3 illustrates a stereogram principle of a touch screen according to another exemplary embodiment of the present invention.

FIG. 3 illustrates a stereogram principle of a touch screen according to still another exemplary embodiment of the present invention. A deformable touch screen according to still another exemplary embodiment of the present invention includes the display unit 110, the touch panel 120, the voltage controller 130, and the signal generator 140.

The touch panel 120 may include the dielectric material 124, the first electrode 121 coated on one end of the dielectric material 124, the second electrode 122 coated on the other end of the dielectric material 124, the non-conductive material 123 coated on the second electrode 122, and the conductive metal 126 coated on the coated non-conductive material 123. When the voltage controller 130 applies a voltage having the same pole to each of the first electrode 121 and the second electrode 122, a repulsive force is generated between the first electrode 121 and the second electrode 122. Thereafter, when an absolute value of the voltage of the first electrode is gradually increased, the repulsive force between the first electrode 121 and the second electrode 122 is increased. When the repulsive force exceeds a threshold, the second electrode 122 forms a convex shape since the first electrode lifts outwards in a fixed state.

On the contrary, when the voltage controller 130 applies a different electrode from that of the second electrode 122 to the first electrode 121, an attractive force is generated between the first electrode 121 and the second electrode 122. Thereafter, when an absolute value of the voltage of the first electrode is gradually increased, the attractive force between the first electrode 121 and the second electrode 122 is increased. When the attractive force exceeds a threshold, the second electrode 122 forms a concave shape since the first electrode moves inwards in a fixed state.

Accordingly, when a lower part of the first electrode 121 is fixed, the second electrode 122 rises outwards or inwards, and thus the touch panel 120 is made into a 3D form in accordance with the shape of the user interface button.

When a dielectric constant of the dielectric material 124 is larger, the attractive force or the repulsive force generated between the first electrode 121 and the second electrode 122 becomes larger in proportion to the dielectric constant.

Figure 4:
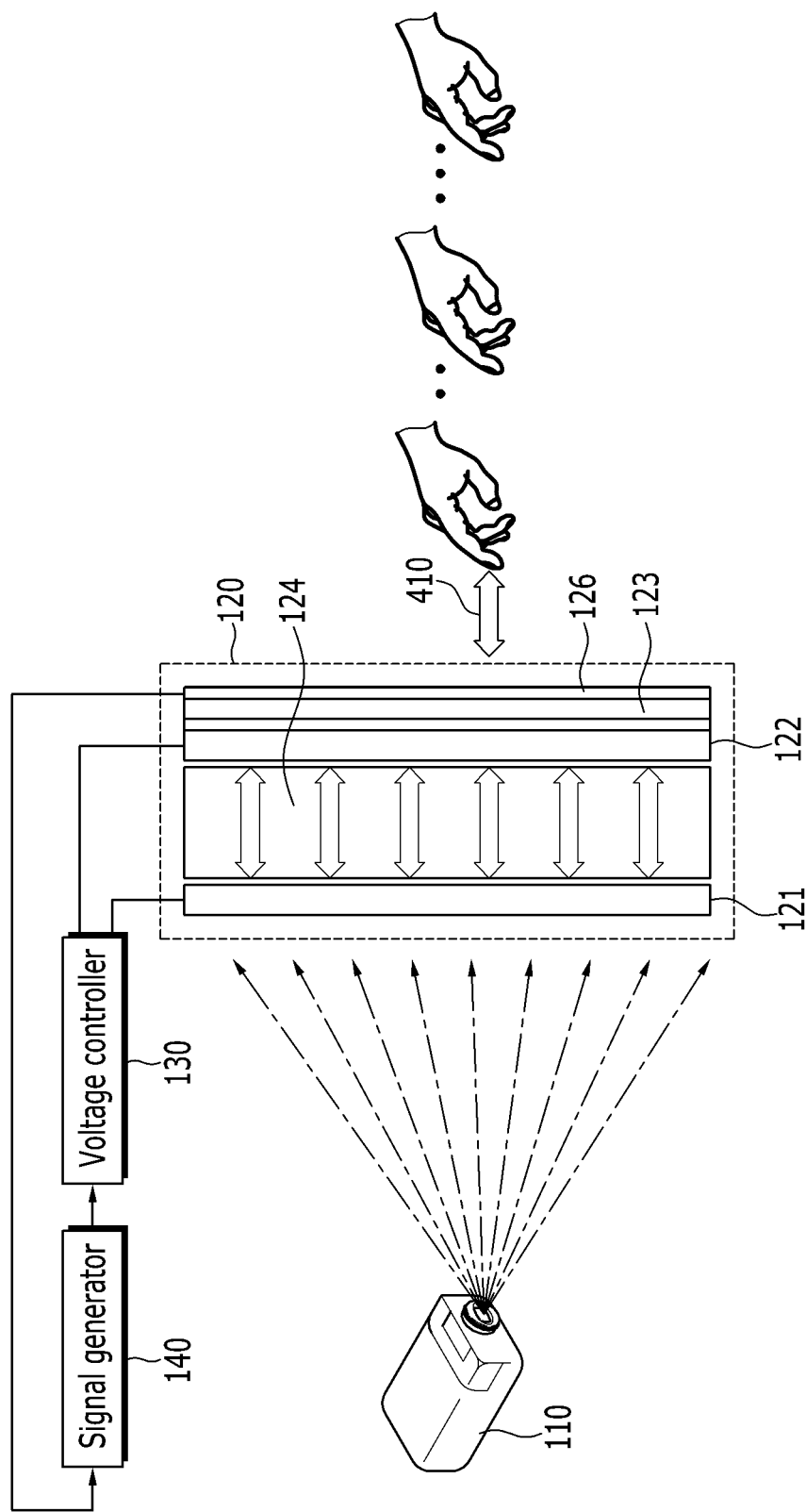
FIG. 4 illustrates a short distance recognition principle of a deformable touch screen according to an exemplary embodiment of the present invention.

FIG. 4 illustrates a short distance recognition principle of a deformable touch screen according to the present invention. The deformable touch screen includes the display unit 110, the touch panel 120, the voltage controller 130, and the signal generator 140. The touch panel 120 includes the dielectric material 124, the first electrode 121 coated on one end of the dielectric material 124, the second electrode 122 coated on the other end of the dielectric material 124, the non-conductive material 123 coated on the second electrode 122, and the conductive metal 126 coated on the coated non-conductive material 123. The conductive metal 126 is connected to the signal generator 140. There is capacitance between the user's hand and the conductive metal 126, and mutual capacitance having a property being in inverse proportion to a distance as the user's hand becomes closer the conductive metal 126.

The signal generator 140 measures an increase and a decrease in mutual capacitance 410. The signal generator 140 generates a stereogram start signal when the mutual capacitance 410 is equal to or larger than a threshold, and generates a stereogram end signal when the measured capacitance 410 is smaller than the threshold.

Figure 5:
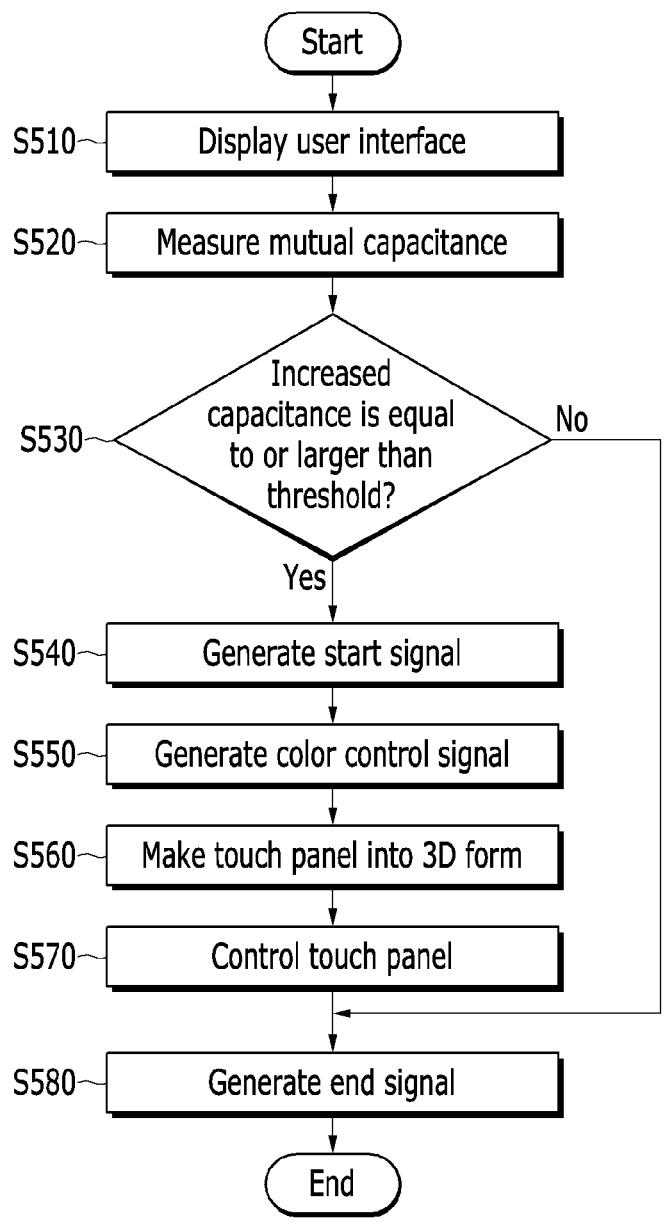
FIG. 5 is a flowchart illustrating an operation of a deformable touch screen according to an exemplary embodiment of the present invention.

FIG. 5 is a flowchart illustrating an operation of a deformable touch screen according to an exemplary embodiment of the present invention. The display unit 110 displays an interface of the user (step S510). The signal generator 140 measures an increase and a decrease in the mutual capacitance 410 of the user's hand and the conductive metal 126 (step S520). The signal generator 140 determines whether the detected increased amount of the capacitance is equal to or larger than a preset threshold (step S530). When the signal generator 140 determines that the increased amount of the capacitance is equal to or larger than the threshold in step S530, the signal generator 140 generates a start signal for starting making the touch panel into the 3D form in accordance with the shape of the user interface button (step S540). When the signal generator 140 determines that the increased amount of the capacitance is equal to or larger than the threshold in step S530, the signal generator 140 generates a color control signal for controlling a color of the touch panel made into the 3D form in accordance with the shape of the user interface button (step S550). The signal generator 140 transmits the start signal to the voltage controller 130, and the voltage controller 130 controls voltages applied to the first electrode 121 and the second electrode 122 according to the start signal to make the touch panel 120 into the 3D form in accordance with the shape of the user interface button (step S570). The user controls the user interface by touching the user interface of the touch panel 120 made into the 3D form (step S580). When the increased amount of the capacitance becomes smaller than a preset second threshold as the control by the user ends and the user's hand recedes from the touch panel 120, the signal generator 140 generates an end signal for ending the stereogram of the touch panel made into the 3D form. When the signal generator 140 determines that the increased amount of the capacitance is smaller than the threshold in step S530, the signal generator 140 generates the end signal for ending the stereogram of the touch panel made into the 3D form (step S540).

Figure 6:
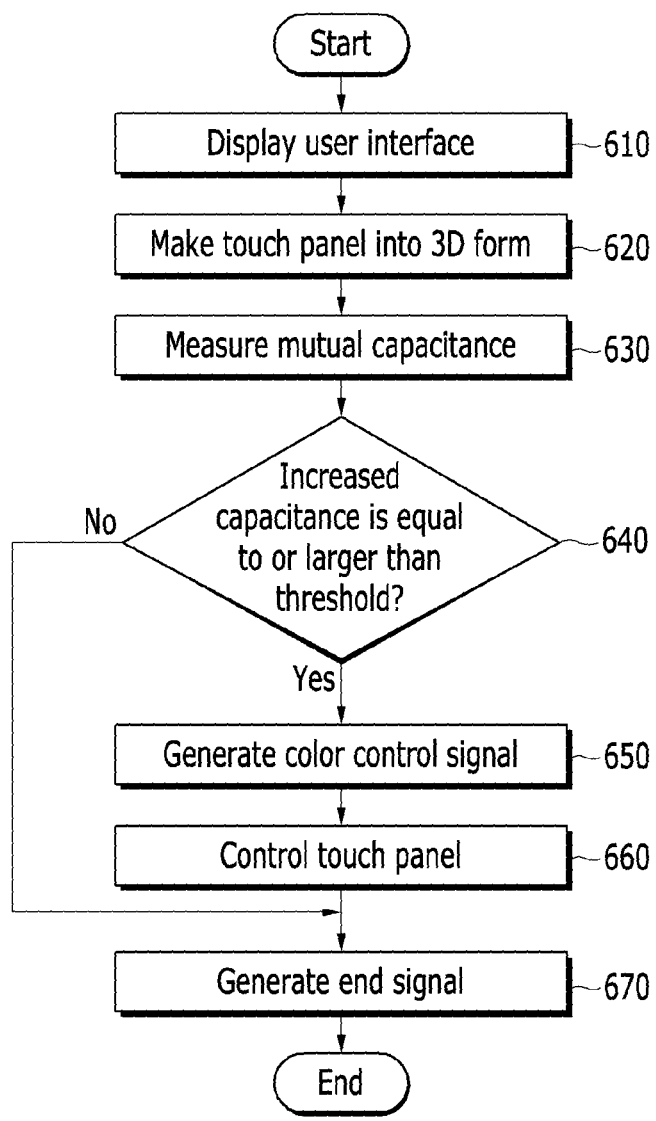
FIG. 6 is a flowchart illustrating an operation of a deformable touch screen according to another exemplary embodiment of the present invention.

FIG. 6 is a flowchart illustrating an operation of a deformable touch screen according to yet another exemplary embodiment of the present invention. The display unit 110 displays the interface of the user (step S610). The signal generator 140 transmits the start signal to the voltage controller 130 according to the control signal received from the outside, and the voltage controller 130 controls the voltage applied to the first electrode 121 and the second electrode 122 according to the start signal to make the touch panel 120 into the 3D form in accordance with the shape of the user interface button (step S620). The signal generator 140 measures an increase and a decrease in the mutual capacitance 410 of the user's hand and the conductive metal 126 (step S630). The signal generator 140 determines whether the measured increased amount of the capacitance is equal to or larger than a preset threshold (step S640). When the signal generator 140 determines that the increased amount of the capacitance is equal to or larger than the threshold in step S640, the signal generator 140 generates a color control signal for controlling a color of the touch panel 120 made into the 3D form in accordance with the shape of the user interface button (step S650). The user controls the user interface by touching the user interface of the touch panel 120 made into the 3D form (step S660). When the increased amount of the capacitance becomes smaller than a preset second threshold as the control by the user ends and the user's hand recedes from the touch panel 120, the signal generator 140 generates an end signal for ending the stereogram of the touch panel made into the 3D form (step S670).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 110: Display unit | 120: Touch panel |
| 130: Voltage controller | 140: Signal generator |

What is claimed is:

1. A deformable touch screen, comprising:
a display unit for displaying a user interface;
a touch panel configured to receive user input and provide tactile user feedback, the touch panel including a dielectric material with a first side and a second side, a first electrode coated on the first side of the dielectric material, a second electrode coated on the second side of the dielectric material, a non-conductive material coated on the second electrode, and a conductive metal coated on the coated non-conductive material;
a voltage controller for controlling a voltage applied between the first electrode and the second electrode; and
a signal generator for applying a signal to the voltage controller,
wherein the signal generator generates a signal to provide tactile user feedback by making a user interface button displayed on the display unit have a 3D form based on a measured result of an increase or a decrease in mutual capacitance between a user's hand and the conductive metal, and
the second electrode forms a convex shape in a state where the first electrode is fixed when the voltage controller applies voltages having an equal pole to the first electrode and the second electrode and an absolute value of the voltage of the first electrode or an absolute value of the voltage of the second electrode exceeds a preset first threshold voltage, and when the voltage controller applies voltages having different poles to the first electrode and the second electrode and the absolute value of the voltage of the first electrode or the absolute value of the voltage of the second electrode exceeds the preset first threshold voltage, the second electrode forms a concave shape in the state where the first electrode is fixed, and thus the touch panel is made into the 3D form in accordance with a shape of the user interface button of the display unit.

2. The deformable touch screen of claim 1, wherein:
the dielectric material is an ionic gel including a free ion therein, and
the first electrode contracts and the second electrode expands due to a movement of the free ion when the voltage controller applies a negative pole to the first electrode and applies a positive pole to the second electrode to provide tactile user feedback.

3. The deformable touch screen of claim 1, wherein:
the signal generator measures the increase and decrease in mutual capacitance of the user's hand and the conductive metal, and the signal generator generates a start signal for starting a stereogram of the touch panel in accordance with a shape of the user interface button of the display unit when the increased amount of the capacitance is equal to or larger than a preset second threshold,
generates an end signal for ending the stereogram of the touch panel when the increased amount of the capacitance is smaller than the preset second threshold, and
generates a color control signal for controlling a color of the touch panel.

* * * * *